United States Patent Office 3,255,021
Patented June 7, 1966

3,255,021
METHOD OF PREPARING FROZEN SEAFOOD
Roland D. Earle, Hollywood, and Clayton E. Snyder, Fort Lauderdale, Fla., assignors to A. E. Staley Manufacturing Company, Decatur, Ill., a corporation of Delaware
No Drawing. Filed May 28, 1963, Ser. No. 283,674
8 Claims. (Cl. 99—195)

Our invention relates to coatings for seafood. More particularly, our invention relates to a method for coating seafood with an aqueous dispersion of starch and a water-soluble algin gum.

Large quantities of frozen sea-food, such as shrimp, scallops, mackerel and red snapper, are marketed annually for human consumption. Frozen seafood, especially frozen shrimp, is regarded as decidedly inferior to the fresh product. When stored for periods of even a few weeks, frozen shrimp lose the characteristic pink and white color of the fresh product and, in addition, become "corky" and tough. Without being limited to any particular theory, it is believed this deterioration is caused principally by dehydration and by oxidation. Many attempts have been made to provide a solution to this problem. For example, special packaging techniques have been developed and special quick-freezing techniques have been utilized. While such procedures have been found to aid somewhat in inhibiting deterioration, frozen seafood is still found to be decidedly inferior to the fresh product. Various coatings have also been applied to seafood to prevent deterioration. This approach also has not been successful due to one or more of several factors, such as undesirable taste of the coating, inability of the coating to adhere to the seafood, cracking and spalling of the coating during handling, etc.

It is, therefore, the principal object of this invention to provide an edible coating for frozen seafood which will minimize deterioration of the seafood during storage.

Another object of this invention is to provide an economical, edible coating for frozen seafood which does not impart an objectionable taste or odor to the seafood.

A still further object of this invention is to provide an edible coating for frozen seafood which will adhere tightly to the seafood without cracking or rupturing.

Other objects and advantages of our invention will become apparent from a further reading of the specification.

While applicable to seafood generally, our invention is especially advantageous when applied to shrimp.

Our process generally consists of first inactivating the enzymes and bacteria in the seafood to be coated and frozen. After inactivation, a coating is formed on the seafood by immersing the seafood in a flowable aqueous dispersion containing an edible starch and a water-soluble algin gum. This coating is then firmly bound to the seafood by applying a water-soluble calcium-containing gelling agent or a water-soluble aluminum gelling agent to the coated seafood. The thus-treated seafood can then be frozen or first breaded and then frozen.

Microorganisms and enzymes in the seafood can be inactivated by any suitable means which will not adversely affect the taste, color, texture or general quality of the seafood. One such satisfactory method of inactivating microorganisms is by heating the seafood in water at temperatures of from about 65 to about 100° C. until inactivation is complete. At 70° C., inactivation is normally completed in about 30 minutes. When cocktail shrimp are treated according to our process, the shrimp can be conveniently flavored to a particular taste by adding such flavoring agents as monosodium glutamate and/or corn syrup to the water in which the shrimp are heated. Another suitable means for inactivating microorganisms and enzymes in seafood involves soaking the seafood in an aqueous solution containing small amounts of available chlorine on the order of 25 to 100 p.p.m. Available chlorine in solution can be readily obtained by bubbling chlorine gas into water or by dissolving calcium hypochlorite in water. Still another method of inactivating microorganisms and enzymes in seafood is by soaking the seafood in a weak solution of acetic acid.

After the inactivation step of our invention, the seafood is immersed in a flowable aqueous dispersion of starch and algin gum for a period of time sufficient to form a coating on the seafood. The mixture of starch and gum utilized in our process should contain on a dry substance basis from about 98 to about 85% by weight edible starch and from about 2 to about 15% by weight algin gum, the weights based on the weight of the mixture. When amounts of algin gum less than 2% are present in the mixture, coatings obtained therefrom tend to be weak and brittle. On the other hand, when amounts of algin gum of more than 15% are present in the mixture, the coatings obtained tend to be rubbery. Mixtures containing from about 5 to about 12% algin gum, and correspondingly from about 95 to about 88% by weight edible starch, are preferred in our process. While the amount of starch-gum mixture in the dispersion can vary, we have found it most satisfactory to employ dispersions containing on a dry substance basis from about 10 to about 40% by weight of the mixture based on the weight of the dispersion. When the aqueous dispersion contains less than 10% of the starch-algin gum mixture, dry substance, the coatings obtained are too thin and weak to adequately protect the seafood under normal conditions of storage and handling. On the other hand, when the weight of the mixture in the dispersion exceeds 40%, the coatings obtained tend to be thick and gummy and deposit themselves unevenly in the grooves of the seafood.

Any edible starch can be utilized in our process which will form a flowable aqueous dispersion with a water-soluble algin gum when combined in the aforestated proportions when the combination is present in the dispersions in amounts ranging from about 10 to about 40%. For example, edible native starches, edible hydrolyzed starches, edible oxidized starches, etc. may be utilized. Edible white dextrins are preferred principally because they form a light, clear film. Also since aqueous dispersions containing large amounts of white dextrins are relatively low in viscosity, such dispersions permit formation of a strong non-gummy coating without excessive buildup of the coating in the grooves of the seafood. In order to form a flowable aqueous dispersion the starch utilized in our process must be pasted. The starch can be pasted before it is blended with the water-soluble algin gum or the starch can be first mixed with the water-soluble algin gum and then pasted.

Any water-soluble algin gum can be satisfactorily utilized in our process. Such gums include sodium alginate, potassium alginate, ammonium alginate, alginic acid, etc., and the like, i.e. salts of alginic acid and anions which form water-soluble salts. Principally because of its ready availability and low cost, sodium alginate is preferred.

In order to produce a coating which best protects seafood during long periods of storage, it is desirable to include in our aqueous coating dispersions an edible oil in amounts up to about 40% by weight based on the weight of the starch-gum mixture. Generally, it is preferable to utilize from about 5 to about 20% edible oil. Inclusion of an edible oil is desirable when the seafood is to be breaded for deep-frying since the oil containing coating is especially resistant to breakage even when subjected to the high temperature of deep-frying. Edible oils which can be satisfactorily utilized include corn oil, safflower oil, cottonseed oil, soybean oil, etc.

After the coating step of our process, the treated seafood is immersed in an aqueous gelling solution containing a water-soluble source of calcium ions such as calcium chloride, calcium citrate, calcium acetate, calcium gluconate, etc. The seafood must remain in the gelling solution for a period of time sufficient to firmly gel the coating. However, if the seafood is allowed to remain in the gelling solution for too long, the seafood acquires a bitter taste. Naturally, the proper holding time depends on the concentration of calcium in the solution. It is thus critical in our process that the concentration of calcium in the solution and the holding time of the seafood in the gelling solution be regulated so that the coating is firmly gelled but that a bitter taste from the calcium is not imparted to the seafood. For example, we have found that firm gel can be formed using a 0.2 molar solution of calcium chloride and a holding time as low as 1 minute. When a 0.2 molar solution of calcium chloride is utilized with a holding of 2 minutes, generally no bitter taste is imparted to the seafood. However, under the same conditions, a holding time of 25 minutes causes the seafood to have a bitter taste. Higher concentrations of calcium in the gelling solution and shorter holding times and also lower concentrations of calcium in the gelling solution and longer holding times can be satisfactorily employed.

After the gelling step of our process, the treated seafood is preferably washed with water or with a calcium solution containing a much lower concentration of calcium than the original gelling solution. This wash is intended to remove any excess calcium. After washing, the seafood can be frozen and packaged. If desired, the seafood can be first breaded and then frozen. Any conventional breading mixture which is adaptable for use on frozen seafood can be utilized in conjunction with our process.

The following examples further serve to illustrate our invention. However, we do not intend to be limited to the details disclosed therein.

*Example I*

Three hundred and seventy-five grams of a mixture containing 38 grams of sodium alginate and 337 grams of white dextrin were slowly added with accompanying agitation to a coating vessel containing 2125 grams of distilled water. The resulting mixture was heated to 75° C. and maintained at that temperature for 2 hours with continued agitation to obtain a uniform aqueous dispersion. Two pounds of deveined, fresh shrimp were placed in an aqueous solution formed by dissolving 304 grams of corn syrup and 12.5 grams of monosodium glutamate in 2183 grams of distilled water, the solution having a temperature of 70° C. The shrimp were held in the solution for 30 minutes during which time the solution temperature was maintained at 70° C. The shrimp were then totally immersed in the dextrin-alginate dispersion in the coating vessel. After immersion in the contents of the coating vessel, the shrimp were placed in an aqueous solution prepared by dissolving 55 grams of anhydrous calcium chloride in 2445 grams of distilled water. The shrimp were held in the calcium chloride solution for a period of 2.5 minutes and then were removed and rinsed for 10 seconds in an aqueous solution consisting of 27.5 grams of anhydrous calcium chloride and 2445 grams of distilled water. The shrimp were then drained and immediately frozen. The shrimp were stored in the frozen state for three months and then thawed. The thawed shrimp were observed to have retained their original flavor, texture and color.

*Example II*

Two pounds of deveined fresh shrimp were treated according to the process of Example I with the exception that they were not coated with the aqueous starch-alginate dispersion and were not immersed and washed with calcium chloride solutions. At the end of the 3-month storage, the shrimp were thawed. The color of the thawed shrimp had changed from pink and bright white to a reddish orange and dull white. The shrimp were found to be dry and tough and were generally of poor texture.

A five member taste panel compared the taste and texture of the coated shrimp of Example I with the uncoated shrimp of Example II. All members of the panel preferred the taste and texture of the shrimp prepared in Example I over the shrimp prepared in Example II.

*Example III*

The process of Example I was followed with the exception that Spanish mackerel and kingfish were the seafood utilized instead of shrimp. Results similar to Example I were obtained.

*Example IV*

Twenty-six and seven tenths grams of corn oil and 293.4 grams of a mixture containing 266.7 grams white dextrin and 26.7 grams sodium alignate were slowly added to a coating vessel containing 1680 grams of distilled water. The resulting mixture was heated to about 75° C. with continued agitation to obtain a uniform aqueous dispersion. One pound of deveined shrimp was placed in an aqueous chlorine solution containing 30 p.p.m. available chlorine and having a temperature of 35° C. The shrimp were allowed to soak about 1 hour in the chlorine solution. At the end of the 1-hour period, the shrimp were removed from the chlorine solution and were immersed in the dextrin-alginate dispersion in the coating vessel. After immersion in the contents of the coating vessel, the shrimp were placed in an aqueous solution prepared by dissolving 55 grams of anhydrous calcium chloride in 2445 grams of distilled water. The shrimp were held in the calcium chloride solution for a period of about 2 minutes and then were removed and rinsed with water. The shrimp were then drained, breaded and immediately frozen. The shrimp were stored in the frozen state for 6 months. At the end of the 6-month period, the shrimp were thawed, and then deep fried in corn oil. The deep-fried shrimp were then observed and the breading was found to have adhered well to the shrimp, unlike the usual frozen, breaded shrimp.

Since many embodiments of this invention may be made and since many changes may be made in the embodiments described, the foregoing is to be interpreted as illustrative and our invention is defined by the claims appended hereafter.

We claim:

1. A method for preparing frozen seafood which is resistant to deterioration which comprises deactivating the microorganisms and enzymes in the seafood, immersing the deactivated seafood in a flowable aqueous dispersion to form a coating on the seafood, the said dispersion containing on a dry substance basis from about 10 to about 40% by weight based on the weight of the dispersion of a starch-water-soluble algin gum mixture, the said mixture containing on a dry substance basis from about 85 to about 98% by weight edible starch and correspondingly from about 2 to about 15% by weight water-soluble algin gum, removing the seafood from the flowable aqueous dispersion, immersing the seafood in an aqueous gelling solution containing a water-soluble source of calcium ion to gel the coating on the seafood, the time of immersion and the concentration of the calcium in the solution being such that the coating is firmly gelled but a bitter taste is not imparted to the seafood, removing the seafood from the said solution and freezing the seafood.

2. A method of preparing frozen seafood which is resistant to deterioration which comprises deactivating the microorganisms and enzymes in the seafood, immersing the deactivated seafood in a flowable aqeuous dispersion to form a coating on the seafood, the said dispersion containing on a dry substance basis from about 10 to about 40% by weight based on the weight of the dispersion of a starch-water-soluble algin gum mixture, the said mixture containing on a dry substance basis from about 88 to about 95% by weight edible starch and correspondingly from about 5 to about 12% by weight water-soluble algin gum, removing the seafood from the flowable aqueous dispersion, immersing the seafood in an aqueous gelling solution containing a water-soluble source of calcium ion to gel the coating on the seafood, the time of immersion and the concentration of the calcium in the solution being such that the coating is firmly gelled but a bitter taste is not imparted to the seafood, removing the seafood from the solution, washing the seafood and freezing the seafood.

3. The method of claim 2 wherein the seafood is shrimp.

4. The method of claim 2 wherein the algin gum is sodium alginate.

5. The method of claim 2 wherein the starch is white dextrin.

6. A method for preparing frozen seafood which is resistant to deterioration which comprises deactivating the microorganisms and enzynes in the seafood, immersing the deactivated seafood in a flowable aqueous dispersion to form a coating on the seafood, the said dispersion containing on a dry substance basis from about 10 to abuot 40% by weight based on the weight of the dispersion of a starch-water-soluble algin gum mixture and from about 5 to about 40% by weight based on the weight of the mixture of an edible oil, the said mixture containing on a dry substance basis from about 85 to about 98% by weight edible starch and correspondingly from about 2 to about 15% by weight water-soluble algin gum, removing the seafood from the flowable aqueous dispersion, immersing the seafood in an aqueous gelling solution containing a water-soluble source of calcium ion to gel the coating on the seafood, the time of immersion and the concentration of the calcium in the solution being such that the coating is firmly gelled but a bitter taste is not imparted to the seafood, removing the seafood from the said solution and freezing the seafood.

7. A method for preparing frozen seafood which is resistant to deterioration which comprises deactivating the microorganisms and enzymes in the seafood, immersing the deactivated seafood in a flowable aqueous dispersion to form a coating on the seafood, the said dispersion containing on a dry substance basis from about 10 to about 40% by weight based in the weight of the dispersion of a starch-water-soluble algin gum mixture and from about 5 to about 40% by weight based on the weight of the mixture of an edible oil, the said mixture containing on a dry substance basis from about 85 to about 98% by weight edible starch and correspondingly from about 2 to about 15% by weight water-soluble algin gum, removing the seafood from the flowable aqueous dispersion, immersing the seafood in an aqueous gelling solution containing a water-soluble source of calcium ion to gel the coating on the seafood, the time of immersion and the concentration of the calcium in the solution being such that the coating is firmly gelled but a bitter taste is not imparted to the seafood, removing the seafood from the said solution, then breading the seafood and freezing the breaded seafood.

8. The method of claim 7 wherein the about of edible oil ranges from about 5 to about 20%.

References Cited by the Examiner
UNITED STATES PATENTS

| 2,758,929 | 8/1956 | Toulmin | 99—169 X |
| 2,763,557 | 9/1956 | Helgerud | 99—169 X |
| 2,785,075 | 3/1957 | Malecki. | |
| 3,141,779 | 7/1964 | Podebradsky et al. | 99—169 X |

A. LOUIS MONACELL, *Primary Examiner.*

HYMAN LORD, *Examiner.*